US009625032B2

(12) United States Patent
Maurer et al.

(10) Patent No.: US 9,625,032 B2
(45) Date of Patent: Apr. 18, 2017

(54) METHOD FOR EXECUTING A GEARSHIFT IN AN AUTOMATIC TRANSMISSION (71) Applicant: ZF Friedrichshafen AG, Friedrichshafen (DE)

(72) Inventors: Markus Maurer, Lindau (DE); Christian Villing, Langenargen (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 238 days.

(21) Appl. No.: 14/533,334

(22) Filed: Nov. 5, 2014

(65) Prior Publication Data
US 2015/0127231 A1 May 7, 2015

(51) Int. Cl.
| | |
|---|---|
| *F16H 61/04* | (2006.01) |
| *F16H 61/686* | (2006.01) |
| *F16H 3/66* | (2006.01) |
| *F16H 3/44* | (2006.01) |

(52) U.S. Cl.
CPC ......... *F16H 61/04* (2013.01); *F16H 61/0403* (2013.01); *F16H 3/66* (2013.01); *F16H 61/686* (2013.01); *F16H 2003/442* (2013.01); *F16H 2061/0407* (2013.01); *F16H 2061/0474* (2013.01); *F16H 2200/2012* (2013.01); *F16H 2200/2046* (2013.01); *F16H 2200/2064* (2013.01); *F16H 2200/2094* (2013.01)

(58) Field of Classification Search
CPC .... F16H 61/04; F16H 61/0403; F16H 61/686; F16H 3/66
See application file for complete search history.

(56) References Cited

U.S. PATENT DOCUMENTS

| | | | | |
|---|---|---|---|---|
| 6,080,082 A | * | 6/2000 | Steeby | B60W 10/06 477/107 |
| 8,394,000 B2 | | 3/2013 | Popp et al. | |
| 8,465,394 B2 | | 6/2013 | Cuppers et al. | |
| 8,500,601 B2 | | 8/2013 | Arnold et al. | |

(Continued)

FOREIGN PATENT DOCUMENTS

DE    10 2009 056 793 A1    6/2011

OTHER PUBLICATIONS

German Search Report, Jun. 18, 2014.

*Primary Examiner* — Jacob S Scott
(74) *Attorney, Agent, or Firm* — Dority & Manning, P.A.

(57) ABSTRACT

A method is provided for executing a gearshift in an automatic transmission with several shifting elements. Upon the execution of the gearshift, a first frictional-locking shifting element is opened and a second positive-locking shifting element is closed. If, upon the execution of the gearshift, an input torque of the automatic transmission is less than a threshold value, after at least partially opening the frictional-locking shifting element and after releasing the positive-locking shifting element, there is a monitoring of whether the positive-locking shifting element is transferred into its end position. If it is then determined that the positive-locking shifting element is not in its end position, a torque transferred by the partially open frictional-locking shifting element initially increases. If, despite the increase in torque transferred by the frictional-locking shifting element, the positive-locking shifting element is not in its end position, the operating pressure of the positive-locking shifting element is then increased.

11 Claims, 3 Drawing Sheets

(56) References Cited

U.S. PATENT DOCUMENTS

2013/0151094 A1* 6/2013 Steinhauser .......... F16H 61/061
                                                        701/60
2014/0074362 A1* 3/2014 Arnold .................... F16H 61/12
                                                        701/54
2016/0102756 A1* 4/2016 Schmidt .............. F16H 61/0403
                                                        701/51

* cited by examiner

METHOD FOR EXECUTING A GEARSHIFT IN AN AUTOMATIC TRANSMISSION

The invention relates to a method for executing a gearshift in an automatic transmission. The invention also relates to a control device for carrying out the method.

BACKGROUND

It is already known from practice that, in automatic transmissions, positive-locking shifting elements are increasingly used as shifting elements. Compared to frictional-locking shifting elements, positive-locking shifting elements have the advantage of requiring less installation space, and no frictional energy arises on them. In each engaged gear of such an automatic transmission, a first number of shifting elements of the transmission are closed or switched on, and a second number of shifting elements of the transmission are open or switched off, whereas, upon the execution of a gear change from an actual gear to a target gear, at least one first shifting element is open or switched off, and at least one second shifting element is closed or switched on. Positive-locking shifting elements may be closed only in a narrow window of rotational speeds. The complete closing of a positive-locking shifting element may be monitored with an end position sensor allocated to the positive-locking shifting element.

If, upon the execution of a gear change, a positive-locking shifting element is not fully closed, intermediate positions, such as tooth-to-tooth positions and/or flank jams and/or edge jams can be formed on it. If, upon the execution of a gear change, a positive-locking shifting element cannot be fully closed, it is subject to a considerable risk of damage. Therefore, upon a gear change involving a positive-locking shifting element, it must be monitored and ensured that a positive-locking shifting element to be shifted or to be closed is properly closed.

On this basis, this invention is subject to the task of creating a new method for executing a gearshift and a control device for carrying out the method.

SUMMARY OF THE INVENTION

Additional objects and advantages of the invention will be set forth in part in the following description, or may be obvious from the description, or may be learned through practice of the invention.

The objects are obtained by methods described and claimed herein.

According to a first aspect of the invention, if, upon the execution of the gearshift, an input torque of the automatic transmission is smaller than a threshold value, in particular upon the execution of a coast downshift, after at least the partial opening of the frictional-locking shifting element and after the release of the positive-locking shifting element, there is a monitoring of whether the positive-locking shifting element is transferred into its end position, whereas, if it is then determined that the positive-locking shifting element has not been transferred into its end position, a torque transferred by the previously partially open frictional-locking shifting element initially increases, and thereby there is an additional monitoring of whether the positive-locking shifting element is transferred into its end position. If it is then determined that, despite the increase in the torque transferred by the frictional-locking shifting element, the positive-locking shifting element has not been transferred into its end position, the operating pressure of the positive-locking shifting element is then increased. This execution of a gearshift is advantageous if thrust gearshifts or traction gearshifts are carried out with relatively low input torque of the automatic transmission. With such gearshifts, the presence of a tooth-to-tooth position is more likely than the presence of a flank jam, such that, after the release of the positive-locking shifting element, a measure for releasing a tooth-to-tooth position is initially carried out, and only upon the subsequent failure of such measure is a measure for releasing a flank jam carried out.

According to an advantageous additional form of the first aspect, the torque transferred by the frictional-locking shifting element is increased to a defined value in a ramp-like and time-controlled manner, whereas the operating pressure of the positive-locking shifting element is increased to a defined value in an impulse-like and time-controlled manner. Preferably, prior to the release of the positive-locking shifting element through an engagement of a drive unit, a differential rotational speed at the positive-locking shifting element and/or a chronological gradient of the differential rotational speed for the debranching of the positive-locking shifting element is corrected. Thereby, an advantageous complete closing of the respective positive-locking shifting element is possible.

According to the second aspect of the invention, if, upon the execution of the gearshift, an input torque of the automatic transmission is higher than a threshold value, in particular upon the execution of a traction downshift, after at least the partial opening of the frictional-locking shifting element prior to the release of the positive-locking shifting element, the torque transferred by the previously partially open frictional-locking shifting element initially increases, subsequently the positive-locking shifting element for releasing is triggered and there is thereby a monitoring of whether the positive-locking shifting element is transferred into its end position. If it is then determined that the positive-locking shifting element has not been transferred into its end position, the torque transferred by the frictional-locking shifting element subsequently further increases, and the operating pressure of the positive-locking shifting element is also increased. This execution of a gearshift is advantageous if traction gearshifts are carried out with relatively high input torque of the automatic transmission. With such gearshifts, the presence of a flank jam is more likely than the presence of a tooth-to-tooth position, such that, after the release of the positive-locking shifting element, if the positive-locking shifting element is not fully closed, a measure for releasing a flank jam is carried out.

According to an advantageous additional form of the second aspect of the invention, there is a further monitoring here of whether the positive-locking shifting element is moved into its end position, and whereas, if it is then determined that, despite the repeated increase in the torque transferred by the frictional-locking shifting element and despite the increase in the operating pressure of the positive-locking shifting element, the positive-locking shifting element has not been transferred into its end position, the frictional-locking shifting element is then fully open while maintaining the increased operating pressure of the positive-locking shifting element, and the input torque of the automatic transmission is reduced through the engagement of the drive unit. Thereby, the risk of damage to the positive-locking shifting element can be further reduced.

According to an advantageous additional form of the first aspect and the second aspect of the invention, there is a further monitoring of whether the positive-locking shifting element has moved into its end position, and whereas, if it is determined that, despite the measures already taken, the positive-locking shifting element has not been transferred into its end position, the operating pressure of the positive-locking shifting element for the momentary or interim driving back of the same is then reduced on a momentary or interim basis. If, despite the measures for the release of the flank jam and for the release of the tooth-to-tooth position, the positive-locking shifting element was not able to be closed as before, a measure to release an edge jam is taken.

A control device in accordance with the invention is described and claimed herein.

Preferred additional forms arise from the following description.

BRIEF DESCRIPTION OF THE DRAWINGS

Embodiments of the invention are, without any limitation, more specifically described by means of the drawing. Thereby, the following is shown.

DETAILED DESCRIPTION

Reference will now be made to embodiments of the invention, one or more examples of which are shown in the drawings. Each embodiment is provided by way of explanation of the invention, and not as a limitation of the invention. For example features illustrated or described as part of one embodiment can be combined with another embodiment to yield still another embodiment. It is intended that the present invention include these and other modifications and variations to the embodiments described herein.

This invention relates to a method for executing a gearshift in an automatic transmission and a control device for carrying out the method. An automatic transmission includes multiple shifting elements, which may be designed as frictional-locking shifting elements and as positive-locking shifting elements. Frictional-locking shifting elements are usually formed as clutches or brakes, while positive-locking shifting elements are usually designed as claw couplings.

Figure 1:
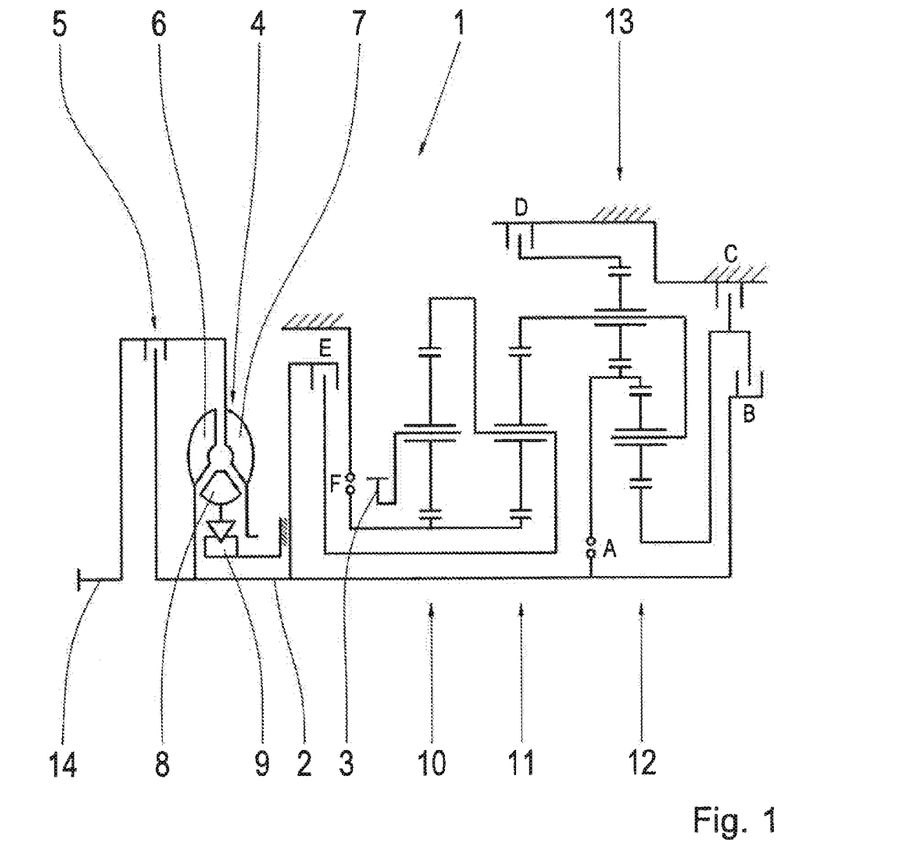
FIG. 1 a diagram of an automatic transmission together with a converter.

FIG. 1 shows a diagram of a transmission 1 formed as an automatic transmission, together with a converter 4, whereas the transmission 1 comprises a transmission input shaft 2 and a transmission output shaft 3. The converter 4 has a torque converter lock-up clutch 5, a turbine wheel 6, a pump wheel 7 and a guide wheel 8, whereas the guide wheel 8 is connected to a so-called "free wheel" 9. With a closed torque converter lock-up clutch 5, the turbine wheel 6 and the pump wheel 7 are coupled to each other. The transmission input shaft 2 corresponds to the converter output shaft or the turbine shaft of the converter 4. An output is coupled to the transmission output shaft 3. A drive shaft of a drive unit is coupled to the converter input shaft 14.

Although, in FIG. 1, the transmission input shaft 2 is coupled to the turbine wheel 6 of the converter 4, and the transmission input shaft 2 accordingly corresponds to the output shaft of the converter 4, it is pointed out that the invention may also be employed in an automatic transmission without such a converter. In such a case, a separating clutch or a starting clutch is switched between the transmission input shaft 2 and a drive shaft of a drive unit.

The transmission 1 shown in FIG. 1 has several gear sets 10, 11, 12 and 13, along with multiple shifting elements A, B, C, D, E and F. Accordingly, in the embodiment shown, the transmission 1 accordingly includes six shifting elements A to F, whereas the shifting elements A and F are designed as positive-locking shifting elements and the shifting elements B, C, D and E are designed as frictional-locking shifting elements. In the embodiment shown, the frictional-locking shifting elements B and E comprise clutches, and the frictional-locking shifting elements C and D comprise brakes.

In each engaged gear, in the transmission of FIG. 1, a first number of shifting elements are closed or switched on, and a second number of shifting elements are open or switched off.

For each of the nine available forward gears 1 to 9 and for the reverse gear R, the following table indicates the shifting elements that are closed or switched on, or open or switched off, in the respective gear.

|   | A | B | C | D | E | F |
|---|---|---|---|---|---|---|
| R |   | X |   | X |   | X |
| 1 | X |   |   | X |   | X |
| 2 | X |   | X |   |   | X |
| 3 | X | X |   |   |   | X |
| 4 | X |   |   |   | X | X |
| 5 | X | X |   |   | X |   |
| 6 | X |   | X |   | X |   |
| 7 | X |   |   | X | X |   |
| 8 |   |   | X | X | X |   |
| 9 |   | X |   | X | X |   |

In the table above, each of the closed or switched on shifting elements is marked with an X. It follows from the table that, in each engaged gear in the transmission 1, three shifting elements are closed or switched on, and three shifting elements are open or switched off.

Upon the execution of a gear change, at least one previously open shifting element must be closed or switched on. This invention relates to details, with the help of which a previously open positive-locking shifting element can be closed with a high shift quality and a reduced risk of damage to the shifting element. Relevant details of the method in accordance with the invention will be described below in detail with reference to FIGS. 2 and 3.

Figure 2:
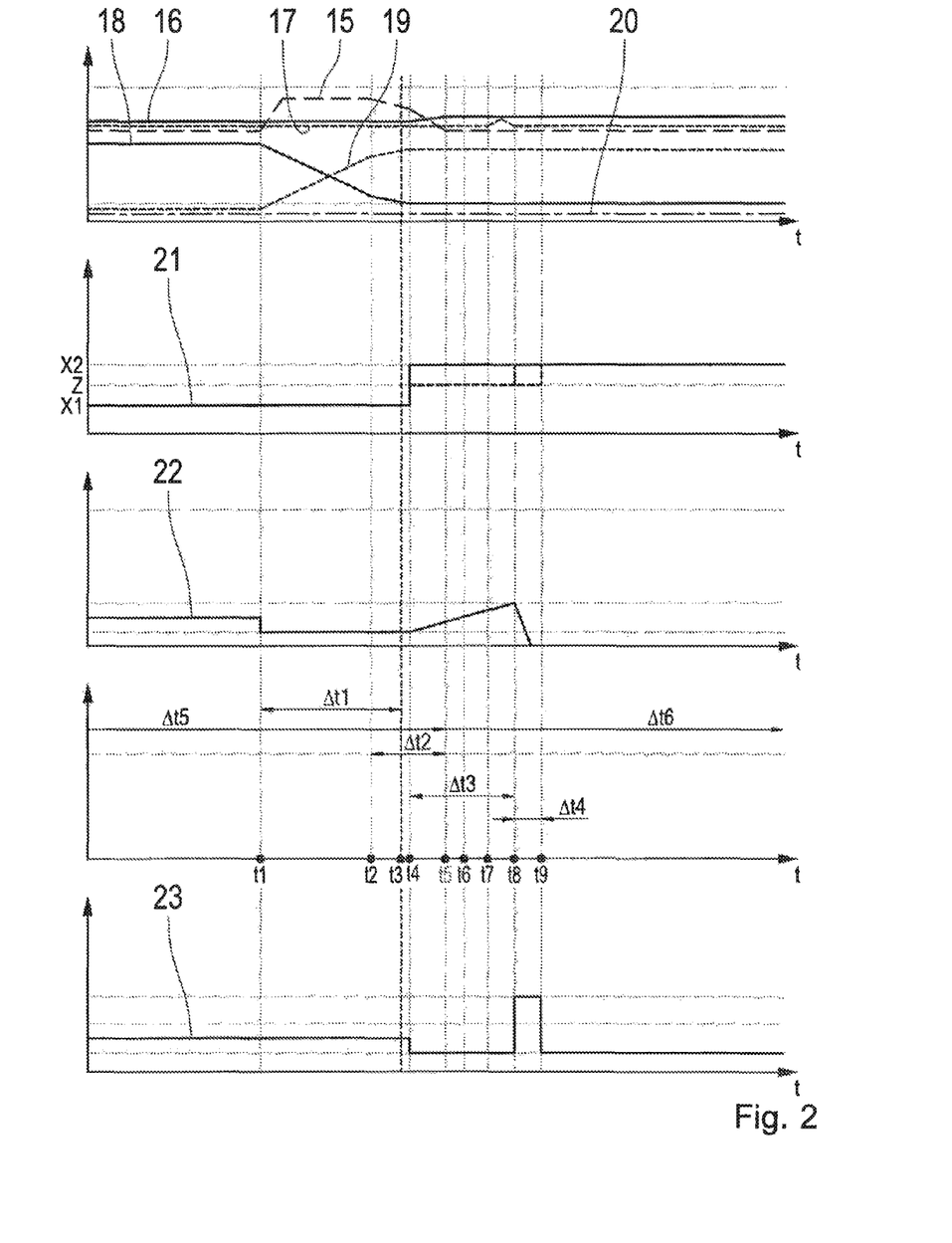
FIG. 2 a timing diagram to illustrate the method in accordance with the invention.

Details of a first method in accordance with the invention for the execution of a gearshift in an automatic transmission, in particular in the automatic transmission of FIG. 1, will be described below with reference to FIG. 2. The method in accordance with the invention described with reference to FIG. 2 is employed if, upon the execution of a gearshift, the input torque of the automatic transmission 1 is less than a threshold value. In particular, the method described with reference to FIG. 2 is employed if a downshift in thrust or a downshift in traction is to be executed with a traction torque that is less than a threshold value.

In FIG. 2, several chronological curve progressions are plotted through the time t, whereas a curve progression 15 visualizes the chronological progression of a torque of the transmission input shaft 2 or the chronological progression of the torque provided by the drive unit, whereas a curve progression 16 visualizes a chronological progression of a torque applying at the transmission output shaft 3, whereas a curve progression 17 visualizes the chronological progression of a torque transferred from the positive-locking shifting element to be closed, whereas a curve progression 18 visualizes the chronological progression of a differential rotational speed at the positive-locking shifting element to be closed, whereas a curve progression 19 visualizes a chronological progression of a rotational speed at the transmission input shaft 2 or a chronological progression of a rotational speed of a drive unit, whereas a curve progression 20 visualizes the chronological progression of a rotational speed of the transmission output shaft 3, whereas a curve progression 21 shows a measurement signal provided by an end position sensor of the positive-locking shifting element to be closed, whereas a curve progression 22 shows the chronological progression of a torque transferred by the frictional-locking shifting element to be opened, and whereas a curve progression 23 visualizes a chronological progression of a pressure control for the positive-locking shifting element to be closed.

With the method described with reference to FIG. 2, a downshift in thrust or with a relatively low traction torque is executed in a such a manner that a frictional-locking shifting element is open or switched off and a positive-locking shifting element is closed or switched on, whereas, with the assistance of the invention, it is ensured that the positive-locking shifting element to be closed can be fully closed with a high shift quality and a low risk of damage.

Prior to the point in time t1 of FIG. 2, in the automatic transmission 1, an actual gear of the downshift to be executed is engaged, whereas, prior to the point in time t1 in accordance with the curve progression 21, the positive-locking shifting element to be subsequently closed is found in its fully open end position X1, and in accordance with the curve progression 22, the frictional-locking shifting element to be opened is closed at least to the extent that the same transfers a torque. A fully closed end position of the positive-locking shifting element is visualized in the curve progression 21 through the state X2 and an intermediate position of the same through the state Z.

At the point in time t1, the execution of the gearshift of the downshift to be executed is commenced, whereas, in accordance with FIG. 2, at the point in time t1, the frictional-locking shifting element to be opened is initially further opened in accordance with the curve progression 22. Likewise, beginning with the point in time t1 in accordance with the curve progression 15, through an engagement of the drive unit, namely, through an influence of the torque applying at the transmission input shaft 2, in accordance with the curve progression 18, a differential rotational speed at the positive-locking shifting element to be closed is reduced or adjusted between the points in time t1 and t2, whereas, subsequent to the point in time t2, between the points in time t2 and t3, through the influence of the torque applying at the transmission input shaft 2 (see curve progression 15), in accordance with the curve progression 18, the gradient of the differential rotational speed at the positive-locking shifting element to be closed is further adjusted. In the time span $\Delta t1$ between the points in time t1 and t3, through an engagement of the drive unit, a synchronization of the positive-locking shifting element to be closed accordingly takes place, whereas, beginning with the point in time t2, through the engagement of the drive unit, the gradient of the differential rotational speed at the positive-locking shifting element to be closed is corrected.

After a corresponding reduction in the differential rotational speed and a correction of the gradient of the differential rotational speed at the positive-locking shifting element to be closed (see curve progression 18), the release of the positive-locking shifting element, thus the activation of the same for closing, occurs at the point in time t3. After the release of the positive-locking shifting element, there is a monitoring of whether the positive-locking shifting element has been transferred into its end position.

If, after the release of the positive-locking shifting element to be closed, it is determined at the point in time t4 that the same could not be transferred into its closed end position X2, but rather that it occupies an intermediate position Z (see dashed line of the curve progression 21), the torque transferred by the frictional-locking shifting element (see curve progression 22) initially is increased to a defined value, starting from the point in time t4 to the point in time t8. The increase in the torque transferred by the frictional-locking shifting element preferably takes place in a ramp-like and time-controlled manner.

Through the increase in the torque transferred by the frictional-locking shifting element, upon the execution of a coast downshift or a traction downshift with a low transmission input torque, a measure for the release of a tooth-to-tooth position at the positive-locking shifting element to be closed will be initially taken, whereas, during the time interval $\Delta t3$ and thus during the measure to be carried out for the release of a tooth-to-tooth position between the points in time t4 and t8, there is a monitoring of whether the positive-locking shifting element to be closed can be transferred into its end position X2.

If, despite the increase in the torque transferred by the frictional-locking shifting element, during the time span $\Delta t3$, thus no later than the point in time t8, the positive-locking shifting element to be closed has not been transferred into its end position, subsequently at the point in time t8, namely in the time interval $\Delta t4$ between the points in time t8 and t9 in FIG. 2, there is an increase in the operating pressure (see curve progression 23) for the positive-locking shifting element to be closed and at the same time a reduction from zero of the torque transferred to the frictional-locking shifting element, whereas, through the increase in the operating pressure at the positive-locking shifting element to be closed following an unsuccessful measure to release a tooth-to-tooth position at the positive-locking shifting element to be closed, a measure to release a flank jam at the same is taken. In FIG. 2, such measure to release the flank jam is successful, such that, accordingly, at the point in time t9 in accordance with the curve progression 21 in FIG. 2, the positive-locking shifting element to be closed occupies its fully closed end position X2.

With the method of FIG. 2, which is used for the execution of a coast downshift or a traction downshift with low transmission input torque, prior to the actual release of the positive-locking shifting element to be closed, at the point in time t3 in the time interval $\Delta t1$, there is a synchronization of the positive-locking shifting element through the engagement of the drive unit (curve progression 15). Starting with the point in time t2, the rotational speed gradient of the differential rotational speed (curve progression 18) of the positive-locking shifting element to be closed is corrected by the engagement of the drive unit, whereas the engagement of the drive unit 15 is terminated at the point in time t5. Accordingly, the engagement of the drive unit takes place during the time span $\Delta t2$.

After the release of the positive-locking shifting element to be closed, there is a monitoring of whether the same has been transferred into its closed end position X2. If this is not the case, between the points in time t4 and t8, thus in the time interval $\Delta t3$, a measure to release a possible tooth-to-tooth position at the positive-locking shifting element to be closed is initially taken, i.e., in accordance with the curve progression 22, through the ramp-like or linear increase in the torque transferred by the previously partially open frictional-locking shifting element. If, despite this measure, the positive-locking shifting element to be closed cannot be led into its end position X2, subsequently during the time span Δt4, thus between the points in time t8 and t9, the operating pressure for the positive-locking shifting element to be closed (see curve progression 23) increases in an impulse-like manner, in order to release a possible flank jam present at the positive-locking shifting element to be closed. In accordance with FIG. 2, at the same time as this, in accordance with the curve progression 22, the frictional-locking shifting element to be opened is fully open.

Accordingly, the method of FIG. 2, which, as already mentioned several times, is employed upon the execution of a coast downshift or a traction downshift with a relatively low transmission input torque, is subject to the finding that, upon the execution of such a gearshift, the presence of a tooth-to-tooth position at the positive-locking shifting element to be closed, if the same could not be immediately transferred into its closed end position X2, is most likely.

Therefore, in accordance with FIG. 2, beginning with the point in time t4, measures for the release of such a tooth-to-tooth position at the positive-locking shifting element are initially taken, i.e., by the fact that the torque that is transferred by the frictional-locking shifting element is increased to a maximum value in a ramp-like and time-controlled manner. In accordance with FIG. 2, preferably at the same time beginning with the point in time t4, the pressure control of the positive-locking shifting element is reduced in an incremental manner. Thereby, the radial forces acting on the positive-locking shifting element to be closed are initially increased, and, preferably, the axial forces acting on the same are reduced at the same time.

If, through this measure, the positive-locking shifting element is not transferred into its end position X2, it is likely there is no tooth-to-tooth position on the same; rather, there is a flank jam, such that, subsequently, through the reduction in the torque transferred by the frictional-locking shifting element and through the increase in the pressure control of the positive-locking shifting element, the radial forces acting on the positive-locking shifting element are reduced and the axial forces acting on the same are increased.

In FIG. 2, up to the point in time t5, thus in the time interval Δt5, the old gear, or gear to be disengaged, of the downshift to be executed is active, while, in the time interval Δt6, the new gear, or gear to be engaged, or the downshift to be executed is active.

Figure 3:
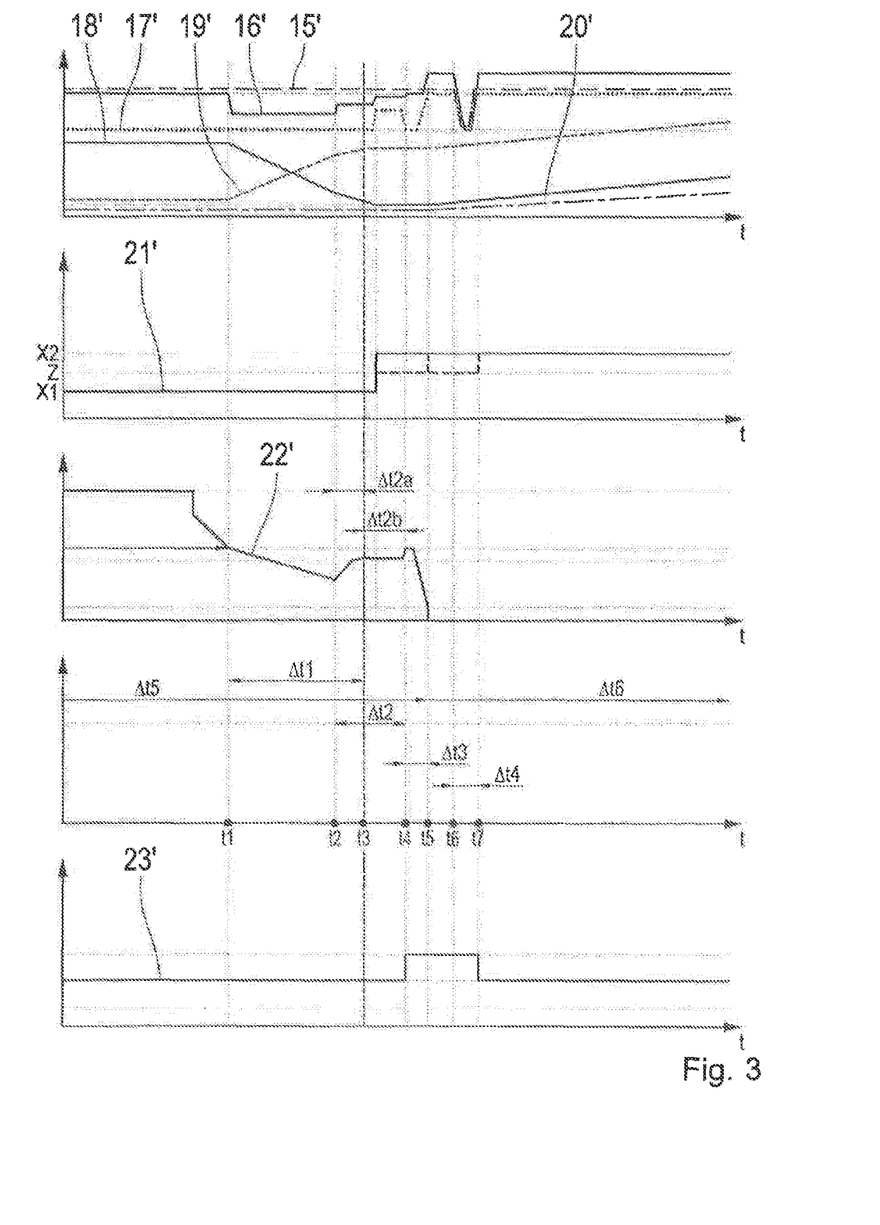
FIG. 3 an additional timing diagram to illustrate the method in accordance with the invention.

With reference to FIG. 3, a variant of the method in accordance with the invention is described, which is employed if a gearshift, in particular a downshift, is to be executed in traction mode with relatively high transmission input torque, thus if a gearshift is carried out in the automatic transmission, for which the transmission input torque is greater than a threshold value.

FIG. 3 again shows several curve progressions. The curve progression 15' shows the chronological progression of a torque applying at the transmission input shaft 2 or the torque provided by a drive unit, whereas the curve progression 16' visualizes the chronological progression of a torque applying at the transmission output shaft 3, whereas the curve progression 17' visualizes the chronological progression of the torque transferred from the positive-locking shifting element to be closed, whereas the curve progression 18' visualizes the chronological progression of the differential rotational speed at the positive-locking shifting element to be closed, whereas the curve progression 19' visualizes the chronological progression of the rotational speed of the transmission input shaft 2 or the chronological progression of the rotational speed of the drive unit, whereas the curve progression 20' visualizes the chronological progression of the rotational speed of the transmission output shaft 3, whereas the signal progression 21' visualizes the position signal of the positive-locking shifting element provided by the end position sensor of the positive-locking shifting element to be closed, whereas the curve progression 22' shows the torque transferred by the open frictional-locking shifting element, and whereas the curve progression 23' visualizes the pressure control for the positive-locking shifting element to be closed.

Prior to the point in time t1 of FIG. 3, in the automatic transmission, the actual gear of the gearshift to be executed is engaged, whereas, in accordance with FIG. 3, prior to the point in time t1, the positive-locking shifting element to be subsequently closed in accordance with the curve progression 21 occupies its fully open end position X1, and whereas the frictional-locking shifting element to be subsequently opened in accordance with the curve progression 22 is initially fully closed. Even prior to the beginning of the actual execution of the gearshift at the point in time t1, in accordance with the curve progression 22' of FIG. 3, the transfer capacity of the frictional-locking shifting element to be subsequently opened is reduced, in order to adjust the transfer capacity to the same to the subsequent gearshift to be executed.

The torque that is transferred by the frictional-locking shifting element to be further subsequently opened at the point in time t1, thus upon the beginning of the execution of the gearshift, is preferably calculated by a control unit and saved for the subsequent execution of the method in accordance with the invention.

Beginning with the point in time t1, thus beginning with the actual execution of the gearshift, in accordance with the curve progression 22', the torque transferred by the frictional-locking shifting element to be opened is further reduced, i.e. up to the point in time t2. Between the points in time t1 and t2, for the synchronization of the positive-locking shifting element to be subsequently closed, the differential rotational speed (curve progression 18') on the same is reduced.

Beginning with the point in time t2, thus still prior to the release of the positive-locking shifting element to be closed at the point in time t3, the torque transferred by the previously partially open frictional-locking shifting element in accordance with the curve progression 23' is initially once again increased, i.e. in order to, between the points in time t2 and t3, adjust the chronological gradient of the differential rotational speed (curve progression 18').

After the adjustment to the chronological gradient of the differential rotational speed is carried out, at the point in time t3, the release of the positive-locking shifting element to be closed then takes place, wherefore the torque transferred by the frictional-locking shifting element to be opened in accordance with the curve progression 22' is initially held constant up to the point in time t4.

Between the points in time t1 and t3, thus in the time interval Δt1, there is a synchronization of the positive-locking shifting element to be closed. In the subsequent time interval Δt2, initially between the points in time t2 and t3, thus in the partial time interval Δt2a, through the increase in the torque transferred by the frictional-locking shifting element, the chronological gradient of the differential rotational speed of the positive-locking shifting element to be closed is adjusted, whereas, during the partial time interval Δt2b of the time interval Δt2, the torque transferred by the frictional-locking shifting element is initially held constant, and there is a monitoring of whether the positive-locking shifting element to be closed could be transferred into its fully closed end position X2.

If it is determined at the point in time t4 that the positive-locking shifting element to be closed could not be transferred into its fully closed position X2, the torque transferred by the frictional-locking shifting element in accordance with the curve progression 22' is subsequently further increased, whereas, beginning with the point in time t4, the operating pressure for the positive-locking shifting element (see curve progression 23') is increased at the same time. In accordance with FIG. 3, the torque transferred from the frictional-locking shifting element increases at a maximum to the amount that was transferred to the frictional-locking shifting element at the point in time t1.

The further increase in torque of the torque transferred by the frictional-locking shifting element at the point in time t4 takes place only momentarily and thus in an impulse-like manner in the time interval Δt3, whereas, at the point in time t5, the torque transferred by the frictional-locking shifting element is fully degraded.

The torque that the frictional-locking shifting element to be opened transfers between the points in time t3 and t4 amounts to approximately 50% of the torque to which the torque transferred by the frictional-locking shifting element at the point in time t4 is increased in an impulse-like manner.

In carrying out the above measures, thus upon the increase in the torque transferred by the frictional-locking shifting element to be opened, there is a monitoring of whether the positive-locking shifting element to be closed can thereby be transferred into its fully closed end position X2.

If it is then determined that, despite the repeated increase in the torque transferred by the frictional-locking shifting element and despite the increase in the operating pressure of the positive-locking shifting element, the positive-locking shifting element to be closed could not be transferred into its fully closed end position X2, subsequently between the points in time t6 and t7, thus in the time interval Δt4, while maintaining the increased operating pressure for the positive-locking shifting element through an engagement of the drive unit in accordance with the curve progression 15', the transmission input torque of the automatic transmission is reduced.

Accordingly, upon the execution of a traction downshift with a relatively high input torque at the automatic transmission 1, initially prior to the release of the positive-locking shifting element to be closed at the point in time t3 during the synchronization of the positive-locking shifting element to be closed in the time interval Δt2, i.e. beginning with the point in time t2, there is a correction of the chronological gradient of the differential rotational speed at the positive-locking shifting element to be closed. Thereby, the point in time t2 is approximately two-thirds of the time interval Δt1. For the correction of the chronological gradient of the differential rotational speed at the positive-locking shifting element to be closed, beginning at the point of time t2, the torque transferred by the previously partially open frictional-locking shifting element is once again increased, by which the radial forces acting on the positive-locking shifting element are ultimately reduced, in order to preventively counteract a possible jam position forming on the positive-locking shifting element. Such torque, to which the transfer capacity of the previously partially open frictional-locking shifting element is increased at the point in time t2 for the adjustment of the gradient of the differential rotational speed at the positive-locking shifting element, is determined depending on the torque that the frictional-locking shifting element has transferred at the point in time t1, thus with the beginning of the execution of the gearshift, and is limited to a defined percentage, for example 50% of such torque. The torque to which the transfer capacity of the previously partially open frictional-locking shifting element is increased at the point in time t2 is preferably updated through a dampened regulator with adaptation, in order to eliminate gear dependencies, hysteresis effects and effects in a row of an increasing transmission input torque.

Such an adaptation takes place upon the presence of stable rotational speed curves, whereas an adaptation of the torque to which the transfer capacity of the previous frictional-locking shifting element at the point in time t2 is increased takes place in relatively small adaptation steps.

If, after the release of the positive-locking shifting element to be closed at the point in time t3, the same could not be transferred into its closed end position X2, the torque transferred by the frictional-locking shifting element is subsequently increased in an impulse-like manner during the time interval Δt3 and is subsequently reduced to zero, whereas, for this purpose, the operating pressure for the positive-locking shifting element to be closed is simultaneously increased.

Between the points in time t5 and t6, only the increased operating force for the positive-locking shifting element to be closed is effective, in order to bring about a release of the flank jam at the positive-locking shifting element, whereas, if, at the point in time t6, the positive-locking shifting element to be closed could still not be transferred into its fully closed end position, subsequently in the time interval Δt4 between the points in time t6 and t7, by means of an engagement of the drive unit through a reduction in the torque applying at the transmission input shaft 2, the positive-locking shifting element is further unburdened, in order to finally transfer the same into a fully closed end position.

In FIG. 3, up to the point in time t5, thus in the time interval Δt5, the old gear, or gear to be disengaged, of the downshift to be executed is active, while, in the time interval Δt6, the new gear, or gear to be engaged, or the downshift to be executed is active.

If, despite the measures described with reference to FIG. 2 for a coast downshift or with reference to FIG. 3 for a traction downshift, the positive-locking shifting element has not been transferred into its end position, the operating pressure of the positive-locking shifting element for the interim driving back of the same is preferably then reduced on an interim basis, in order to release an edge jam at the positive-locking shifting element. In traction mode, however, in the transmission of FIG. 1, a suitable frictional-locking shifting element is initially closed to the extent that the same can transfer torque.

Alternatively, the gearshift to be executed can be cut short after neutral, or started from the beginning.

The measures described with reference to FIG. 2 for a coast downshift or with reference to FIG. 3 for a traction downshift are preferably only taken if a ratcheting of the positive-locking shifting element was previously ruled out. Ratchetings may be detected by the chronological progression of the differential rotational speed of the positive-locking shifting element. If a ratcheting of the positive-locking shifting element is present, a replacement gear is shifted or initially transferred into neutral after the transmission, and the execution of the gearshift is then repeated.

The position of the positive-locking shifting element is preferably monitored with the assistance of an end position sensor. Alternatively, an electrical path sensor may also be used. The use of an electrical path sensor allows for a more rapid distinction between or detection of ratcheting and/or tooth-to-tooth positions and/or flank jams and/or edge jams, by which the shifting dynamics and shift quality can be further improved.

The invention further relates to a control device for carrying out the method in accordance with the invention. Preferably, the control device comprises a transmission control device for the control and/or regulation of the operation of a transmission, whereas the control device features instruments for carrying out the method in accordance with the invention. Such instruments comprise data interfaces, a data storage device and a processor. The data interfaces serve the purpose of communication and/or data exchange with the structural components involved in carrying out the method, such as the shifting elements and the end position sensors of the positive-locking shifting elements. The data storage device serves the purpose of storing the data, and the processor serves the purpose of processing and/or evaluating the data.

The invention claimed is:

1. A method for executing a gearshift in an automatic transmission with several shifting elements, comprising:
   upon the execution of the gearshift, opening or switching off a first frictional-locking shifting element and closing or switching on a second positive-locking shifting element;
   upon the execution of the gearshift, if an input torque of the automatic transmission is smaller than a threshold value after at least a partial opening of the frictional-locking shifting element and after closing of the positive-locking shifting element, monitoring whether the positive-locking shifting element has transferred into its end position;
   if it is then determined that the positive-locking shifting element has not been transferred into its end position, increasing a torque transferred by the frictional-locking shifting element;
   further monitoring whether the positive-locking shifting element is transferred into its end position; and
   if it is then determined that, despite the increase in the torque transferred by the frictional-locking shifting element, the positive-locking shifting element has not been transferred into its end position, increasing the operating pressure of the positive-locking shifting element.

2. The method according to claim 1, wherein the torque transferred by the frictional-locking shifting element is increased to a defined maximum value in a ramp-like manner.

3. The method according to claim 1, wherein the operating pressure of the positive-locking shifting element is increased to a defined value in an impulse-like manner and, at the same time, the torque transferred by the frictional-locking shifting element is reduced.

4. The method according to claim 1, wherein prior to closing of the positive-locking shifting element through an engagement of a drive unit, a differential rotational speed at the positive-locking shifting element or a chronological gradient of the differential rotational speed at the positive-locking shifting element for debranching of the positive-locking shifting element is corrected.

5. A method for executing a gearshift in an automatic transmission with several shifting elements, comprising:
   upon the execution of the gearshift, opening or switching off a first frictional-locking shifting element and closing or switching on a second positive-locking shifting element;
   upon execution of the gearshift, if an input torque of the automatic transmission is higher than a threshold value after at least a partial opening of the frictional-locking shifting element and prior to closing of the positive-locking shifting element, increasing the torque transferred by the partially open frictional-locking shifting element and subsequently triggering the positive-locking shifting element for closing;
   subsequently monitoring whether the positive-locking shifting element is transferred into its end position; and
   if it is then determined that the positive-locking shifting element has not been transferred into its end position, further increasing the torque transferred by the frictional-locking shifting element and increasing operating pressure of the positive-locking shifting element.

6. The method according to claim 5, further comprising subsequent monitoring of whether the positive-locking shifting element has moved into its end position, and if it is then determined that, despite the repeated increase in the torque transferred by the frictional-locking shifting element and the increase in the operating pressure of the positive-locking shifting element, the positive-locking shifting element has not been transferred into its end position, then the frictional-locking shifting element is fully open while maintaining the increased operating pressure of the positive-locking shifting element, and the input torque of the automatic transmission is reduced through the engagement of the drive unit.

7. The method according to claim 5, wherein the torque transferred by the frictional-locking shifting element is increased to a defined value in an incremental manner.

8. The method according to claim 5, wherein the operating pressure of the positive-locking shifting element is increased to a defined value in an impulse-like manner.

9. The method according to claim 5, wherein if it is determined that the positive-locking shifting element has not been transferred into its end position, the operating pressure of the positive-locking shifting element for interim driving back of the positive-locking shifting element is then reduced on an interim basis.

10. A control device for executing a gearshift in an automatic transmission with several shifting elements, wherein the control device is configured to implement the method of claim 1.

11. A control device for executing a gearshift in an automatic transmission with several shifting elements, wherein the control device is configured to implement the method of claim 5.

* * * * *